United States Patent [19]
Aldermeshian et al.

[11] Patent Number: 5,745,850
[45] Date of Patent: Apr. 28, 1998

[54] APPARATUS AND METHOD FOR MOBILE (E.G. CELLULAR OR WIRELESS) TELEPHONE CALL HANDOVER AND IMPERSONATION

[75] Inventors: Hrair Aldermeshian, Holmdel; James Francis Day, Colts Neck; Richard H. Janow, South Orange; David B. Menist, Little Silver, all of N.J.

[73] Assignee: Lucent Technologies, Inc., Murray Hill, N.J.

[21] Appl. No.: 327,765

[22] Filed: Oct. 24, 1994

[51] Int. Cl.⁶ .................................................. H04Q 7/38
[52] U.S. Cl. ........................... 455/417; 455/420; 455/567
[58] Field of Search ........................... 379/57, 58, 59, 379/60, 61, 63, 201, 210; 455/33.1, 33.2, 54.1, 56.1, 417, 420, 403, 445, 458, 550, 567, 426

[56] References Cited

U.S. PATENT DOCUMENTS

| | | | |
|---|---|---|---|
| 4,277,649 | 7/1981 | Sheinbein . | |
| 4,313,035 | 1/1982 | Jordan et al. . | |
| 4,642,425 | 2/1987 | Guinn, Jr. et al. | 379/57 |
| 4,658,416 | 4/1987 | Tanaka | 379/57 |
| 4,680,785 | 7/1987 | Akiyama et al. | 379/57 |
| 4,748,655 | 5/1988 | Thrower et al. | 379/60 |
| 4,752,951 | 6/1988 | Konneker | 379/211 |
| 5,029,233 | 7/1991 | Metroka | 455/33.1 |
| 5,097,500 | 3/1992 | Itoh | 379/62 |
| 5,109,405 | 4/1992 | Morganstein | 379/89 |
| 5,243,645 | 9/1993 | Bissell et al. | 379/211 |
| 5,343,240 | 8/1994 | Yu | 348/14 |
| 5,390,235 | 2/1995 | Beasley | 379/60 |
| 5,544,227 | 8/1996 | Blust et al. | 379/63 |

FOREIGN PATENT DOCUMENTS

| | | | |
|---|---|---|---|
| 0264092 | 6/1993 | European Pat. Off. | H04M 3/42 |
| 3-1746 | 1/1991 | Japan | H04M 3/42 |
| 2198910 | 6/1988 | United Kingdom | H04M 3/42 |
| 2234649 | 2/1991 | United Kingdom | H04B 7/26 |

OTHER PUBLICATIONS

"Why Wait for PCS? Personalized Portable Telephone Services are Here Today", Telecommunications, Mar. 1994, pp. 41–44.

"Moving Toward a Wireless InfraStructure", Computer World, Oct. 11, 1993, pp. 51 & 54.

"Wireless Data: Closing the Gap between Promise and Reality" Telecommunications, Mar. 1994, pp. 25–30.

*Primary Examiner*—Dwayne Bost
*Assistant Examiner*—William G. Trost

[57] ABSTRACT

One communications device (called the "impersonating" device) can selectively impersonate another communications device (called the "impersonated" device) by arranging the impersonating device to take over and/or use the same network identification number (typically stored in an identification number memory and used to control selection of incoming calls to which the device responds) normally associated with the impersonated device. As a result of impersonation, there is a hand-off between the devices, with the impersonated device becoming dormant and the impersonating device becoming active, such that calls normally received by the impersonated device are received by the impersonating device, and such that calls originating in the impersonating device get the identical network treatment as would be accorded to calls originated by the impersonated device, all of this without any need to adjust or update profiles stored in a network database. Impersonation can be triggered automatically, as by the physical proximity of one terminal device to the other, or manually, such as by pushing a button on one of the devices.

36 Claims, 6 Drawing Sheets

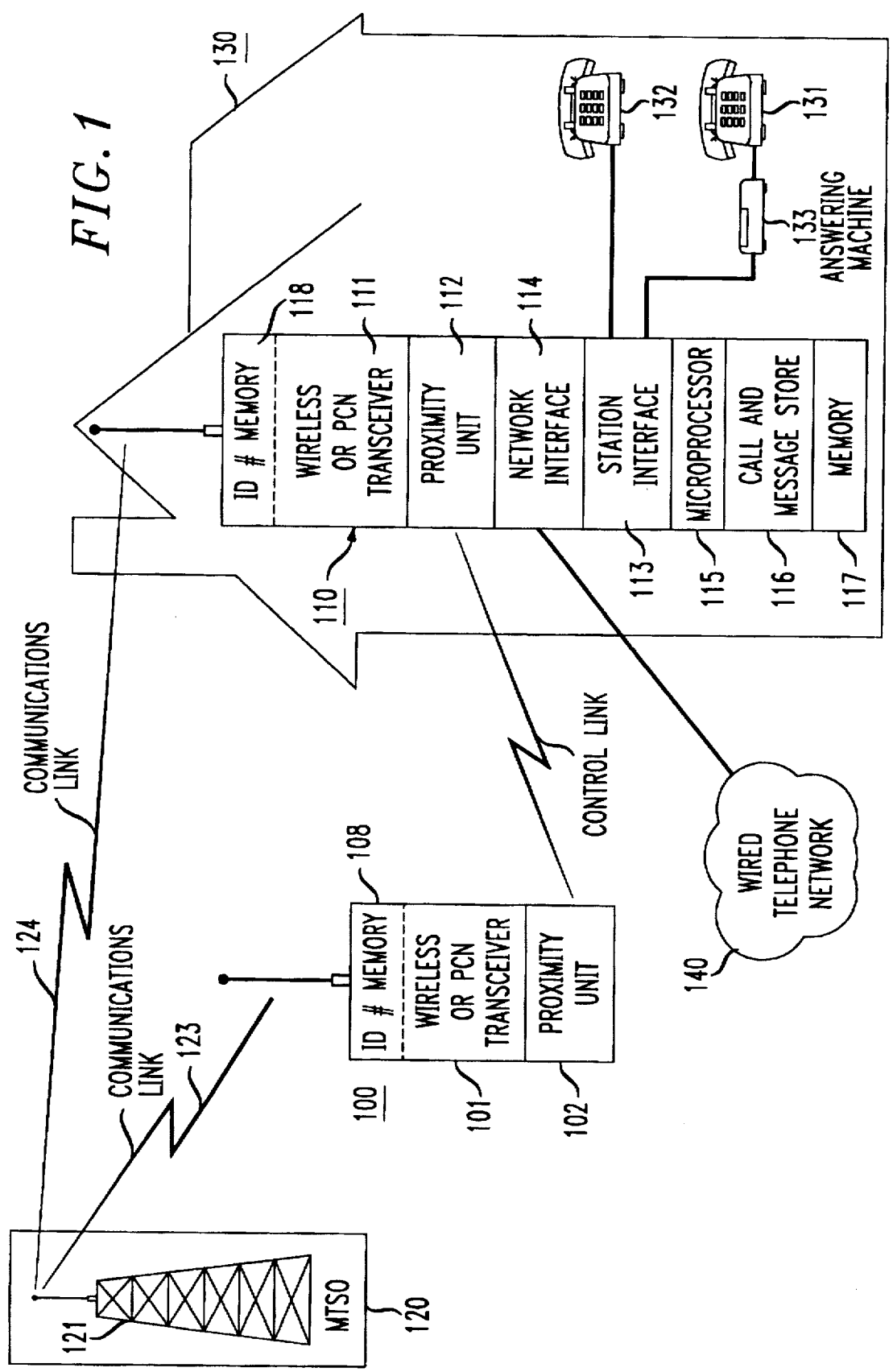

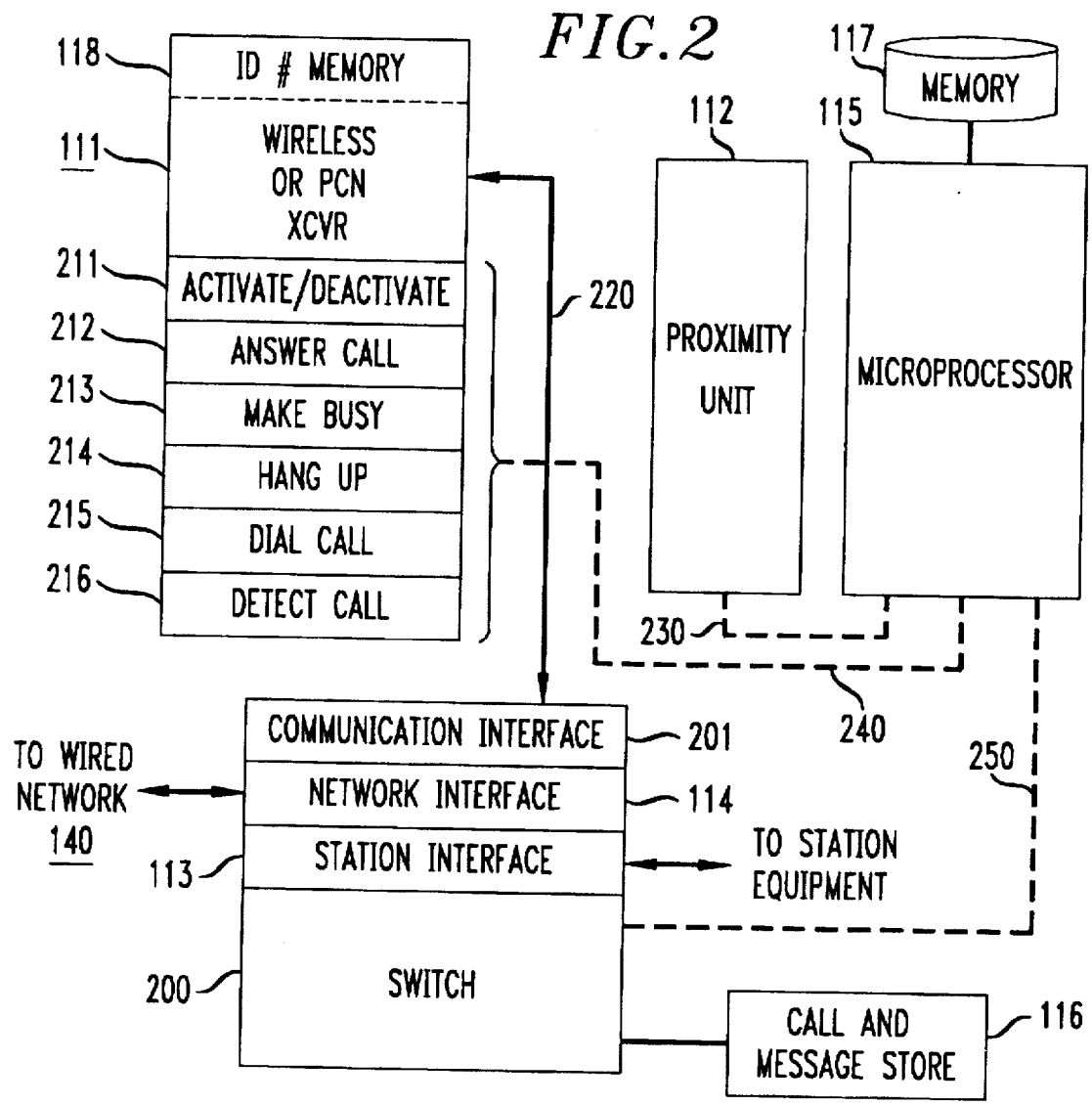
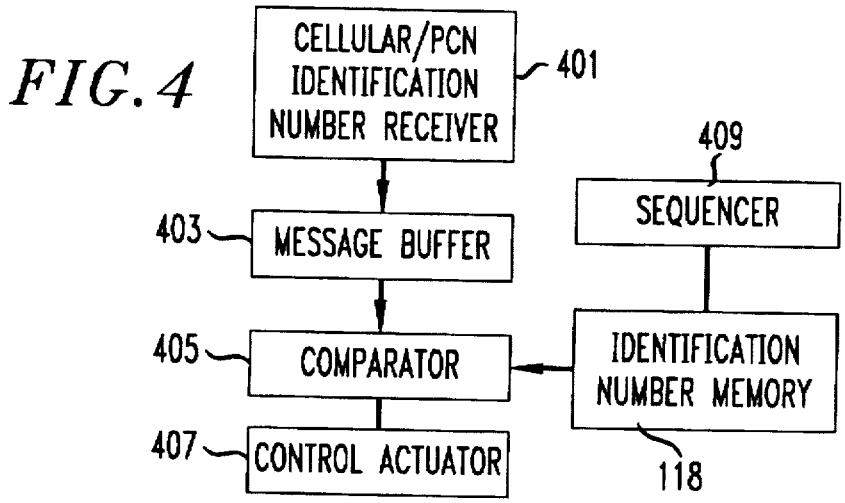

APPARATUS AND METHOD FOR MOBILE (E.G. CELLULAR OR WIRELESS) TELEPHONE CALL HANDOVER AND IMPERSONATION

TECHNICAL FIELD

This invention relates generally to an apparatus and method for originating or completing mobile (e.g. cellular or wireless) telephone calls, and, in particular, to origination or completion of such calls through impersonation wherein one terminal device (such as a transceiver in a base station) takes over and/or uses the network identification number normally associated with another device (such as a car phone or personal cellular communication device) as a result of a hand-off between the devices.

BACKGROUND OF THE INVENTION

Various schemes have been devised to allow telephone calls directed to a called party's personal telephone number to be completed to one of several telephones, depending upon the current location of the person. The notion of a personal number, not associated with a fixed location, but rather with an individual, is explained in U.S. Pat. No. 4,313,035 issued to D. S. Jordan et al. on Jan. 26, 1982, and generally requires that calls to the personal number be routed to a database, where the person's profile is retrieved. The call is then completed to the "then current" number in the profile. Updating of the profile can be accomplished in various ways, such as explained, in U.S. Pat. No. 5,243,645 issued to E. P. Bissell et al. on Sep. 7, 1993. AT&T's Easy Reach® telecommunications service also makes use of individual profiles to assist in call completion.

The updating of profiles stored in a central database so that calls can be rerouted can be inefficient, because of the expense of maintaining the database and the delay associated with formulating and transmitting an update message to the database before rerouting becomes effective, and the further delay resulting from the need to consult the database for each incoming call before routing can be completed.

Additionally, with respect to outgoing calls, the notion of a personal telephone number would conflict with sharing of terminals, typically wireless or cellular telephony devices, that self-identify themselves to communication networks.

SUMMARY OF THE INVENTION

The problems experienced in the prior art are overcome in accordance with the present invention by arranging one communications device, called the "impersonating" device, to selectively impersonate another communications device, called the "impersonated" device. Impersonation is accomplished by arranging the impersonating device to take over and/or use the same network identification number normally associated with the impersonated device; the network identification number is typically stored in an identification number memory in the impersonating device and controls selection of incoming calls to which the impersonating device responds, as well as the handling of outgoing calls made through the impersonating device. As a result of this impersonation, there is a hand-off between the devices, with the impersonated device becoming dormant and the impersonating device becoming active, such that calls normally received by or initiated by the impersonated device are received by or initiated by the impersonating device, all of this without any need to adjust or update profiles stored in a network database. Impersonation can be triggered automatically, as by the physical proximity of one terminal device to the other, or manually, such as by pushing a button on one of the devices.

Impersonation accomplishes two principal functions: first, with respect to incoming calls, calls destined for the impersonated communications device (e.g., a mobile cellular telephone), which is rendered dormant during impersonation, can then be received by the impersonating communications device itself, or by terminal equipment connected to the impersonating communications device. This effectuates a type of call forwarding that does not depend upon any changes being made within the telephone network. Second, calls originating in terminal equipment (e.g., home telephones) connected to the impersonating communications device can advantageously be routed via alternative networks, i.e., either the conventional wired network, or via a wireless network, based upon a choice made by the call originator. This permits calls from stationary equipment to be billed as, and to enjoy, the rate structure and customer profiles of calls made on the wireless network. Additionally, because wireless systems routinely use self-identifying terminals, while traditional wireline systems do not, wireless terminals using impersonation naturally and easily accommodate personal communications for multiple users sharing a common impersonating terminal or base station device.

In accordance with one embodiment of the present invention, a first communications device is "stationary" and a second communications device is "mobile". The stationary device, sometimes called a "base station", includes a transceiver that impersonates or assumes the network identity of a mobile transceiver (such as a cellular car phone or personal communications terminal) when the mobile transceiver travels to within a predetermined distance from the base station. Impersonation occurs by duplicating the network identification numbers contained in the identification number memories of the devices, so that both devices would respond to the same telephone calls, when in an active state. Impersonation is triggered when control signals are transmitted between proximity units contained in both devices, rendering one device dormant and the other active. While impersonation is in effect, incoming wireless telephone calls or messages addressed to or destined for the mobile transceiver are instead received in the base station transceiver, and are routed to terminal equipment that may also be connected to the conventional (i.e., wired) telephone network. Accordingly, the same terminal equipment can receive both conventional calls as well as wireless calls that are received by virtue of impersonation.

With respect to outgoing telephone calls, when impersonation has been effected between the mobile transceiver and the base station, calls originated in the terminal equipment connected to the base station can be routed (a) conventionally, via the wired telephone network, or (b) alternatively, via the transceiver in the base station directly to facilities of a mobile telephone network provider. In this way, a user of the present invention is provided with a means of obtaining "alternate access" in making outgoing calls, so that the wired telephone network can be bypassed and a wireless network used instead. Even when impersonation has not been effected, originated calls can be routed through the base station transceiver (and not the wired network), provided that an additional network identification number is available for use; this avoids the possibility that outgoing calls will interfere with other calls being handled in the mobile transceiver at the same time.

Optionally, in accordance with one aspect of the present invention, if calls made to the impersonating device are not answered, such calls can be (a) stored in a message storage facility contained in the base station itself, or (b) forwarded through the base station to another stand-alone device with answering and storage capability.

In accordance with yet another aspect of the present invention, outgoing calls can be made using the identification number, and thus the "personality" of the mobile device, or, alternatively, can be based upon other stored identification numbers, so that the transceiver can be controlled to appear to the network as a distinct or separate device with respect to outgoing calls. This functionality is particularly useful in associating network based profiles and classes of service that might ordinarily pertain to the mobile device, with the stationary device when it is impersonating the mobile device.

In accordance with yet another aspect of the present invention, a set of mobile devices may impersonate each other for use, for example, by a group of people that share them in the course of their normal work activities.

In accordance with yet another aspect of the invention, the impersonation functionality is automatically suspended when the mobile device is removed from proximity to the stationary device, such as when the person moves away from the home.

BRIEF DESCRIPTION OF THE DRAWING

The present invention will be more fully appreciated by consideration of the following Detailed Description, which should be read in light of the accompanying drawing in which:

FIG. 1 is a block diagram illustrating one embodiment of the present invention in which a first communications device located within a building is made to impersonate a second communications device that is mobile;

FIG. 2 is a block diagram illustrating the arrangement of base station 110 of FIG. 1;

FIG. 4 is a block diagram illustrating the arrangement that may be used in transceiver 111 of FIGS. 1 and 2 when more than one portable device is impersonated;

DETAILED DESCRIPTION

Figure 3:
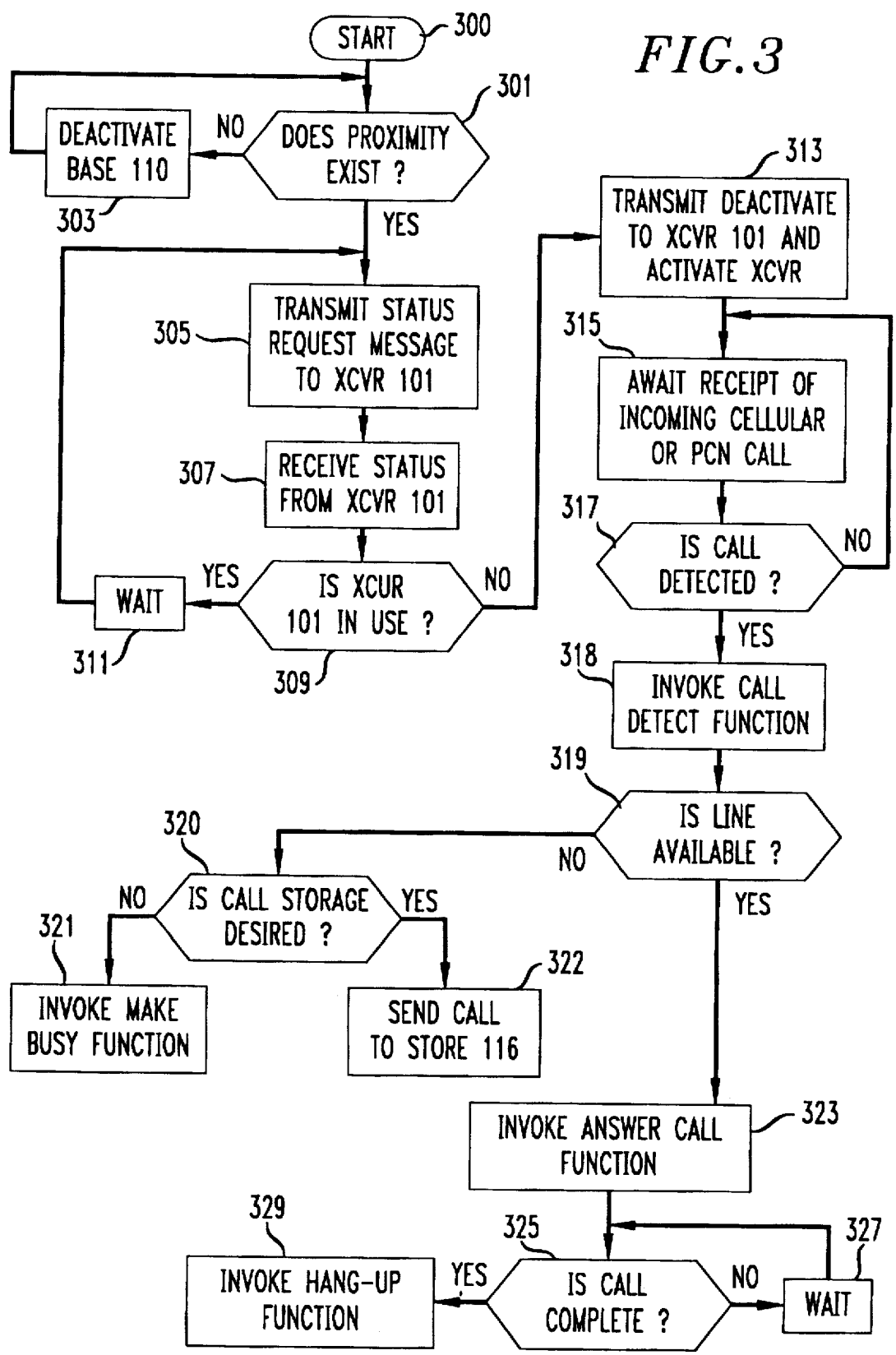
FIG. 3 illustrates the process performed in microprocessor 115 in base station 110 by which impersonation is accomplished.

Referring first to FIG. 1, there is shown a block diagram illustrating the overall arrangement of one embodiment of the present invention by which a first communications device, namely a wireless or PCN transceiver 111 in a base station 110 is made to impersonate a second communications device, namely a wireless or PCN transceiver 101 that is part of a mobile cellular telephone 100. Each transceiver includes an identification number memory, which contains an identification number that is used by the transceiver to select or identify incoming calls or other communications intended for that transceiver, and to also identify outgoing calls or other communications originated from that transceiver. For the purposes of the ensuing discussion, it is assumed, unless otherwise stated, that the identification number stored in the identification number memory 108 within transceiver 101 is the same as the identification number stored in the identification number memory 118 within transceiver 111, so that both transceivers would respond to the same incoming telephone calls, if both transceivers were active at the same time and both were within range of the transmitter that broadcasted the calls and accompanying identification number. The duplication of identification numbers can be accomplished in various ways, such as by manufacturing and distributing transceivers 101 and 111 as "matched sets", by providing transceivers with the capability of storing and selectively using one of several identification numbers, as discussed in connection with FIG. 4, by allowing for the remote entry of identification numbers in the identification number memories through signaling via control links between the transceivers, or in many other ways that will be apparent to those skilled in the art.

When a person using mobile cellular telephone 100 is within a predetermined distance from building 130 in which base station 110 is located, and therefore wishes to receive incoming calls placed to mobile cellular telephone 100 on telecommunications terminals such as terminals 131 or 132 in building 130, a proximity unit 112 in base station 110 is arranged, in accordance with our invention, to communicate with an associated proximity unit 102 in mobile cellular telephone 100, so as to trigger or begin the impersonation process. The communications between proximity units 102 and 112 can be carried on a control link, which may be a relatively short range radio channel that is separate from the channel used for cellular or wireless communication itself, such as the radio channel currently used in wireless telephones to enable the exchange of control information (paging, on-hook and off-hook signaling) between a wireless telephone handset and the wireless telephone base unit. Proximity may be determined simply by comparing the strength of the signals received on this control link to a preset threshold, or in other ways such as by computing the time delay between transmission of a control signal by one proximity unit and receipt of an acknowledgment from the other proximity unit.

When impersonation is triggered by the proximity of mobile cellular telephone 100 to base station 110, transceiver 101 becomes dormant and transceiver 111 becomes active. Voice calls or data messages transmitted from a conventional mobile telephone switching office (MTSO) 120 via an associated transmitting antenna 121 that contain the identification number of, and thus are addressed to, mobile cellular telephone 100, can be received via over-the-air communications links 123 and 124 both by transceiver 101 as well as by transceiver 111 in the base station 110, since both transceivers are near each other and thus will receive the same signals. However, because impersonation is in effect, and transceiver 101 is thus dormant, the ringer or paging unit contained therein is not triggered. Concurrently, upon receipt of the same call in transceiver 111, the control program in base station 110 is activated, so that the call can be routed through a station interface 113 in base station 110 to one of the telecommunications terminals 131 or 132 (which may be ordinary telephones) in building 130. Communication from transceiver 111 to the terminals 131 and 132 can be either by a wired or wireless connection, using conventionally available equipment. If desired, a terminal may be "built in" to base station 110. Base station 110, which is described in more detail below in conjunction with FIG. 2, is also arranged to perform various call distribution functions, under the overall control of a microprocessor 115.

With respect to incoming calls, it is seen from the foregoing description that even though a caller (in a voice call) or a sender (in a data call) placed a call or addressed a message to the number assigned to mobile cellular telephone 100, the call is ultimately received by terminals 131 or 132, which, if they are telephones, are arranged to simply ring and be answered normally. If certain calls placed through base station 110 to these telephones is not answered, those calls can be delivered and either held in a call/message storage facility 116 optionally built into base station 110, or be forwarded through base station 110 to answering machine 133 having conventional answering and message storage capability.

In the embodiment of FIG. 1, outgoing calls made from terminals 131 or 132 may be routed from base station 110 through network interface 114 to the wired telephone network 140 as conventional calls. Alternatively, since transceiver 101 in mobile cellular telephone 100 is dormant (and thus not in use), outgoing calls can be transmitted as cellular calls by transceiver 111 in base station 110. These outgoing calls can be made using the identification number and thus the "personality" of mobile cellular telephone 100, or, alternatively, can be based upon other identification numbers that can be (a) stored in identification number memory 118 in transceiver 111, or (b) stored in a memory unit 117 in base station 110, and downloaded to memory 118 as appropriate. In this way, transceiver 111 can be controlled to appear to the cellular telephone network and MTSO 120 as a distinct or separate device with respect to outgoing calls. This functionality is particularly useful in associating network based profiles and classes of service that might ordinarily pertain to one mobile device, with stationary transceiver 111 when it is impersonating transceiver 101.

When mobile cellular telephone 100 is removed from proximity to base station 110, the impersonation functionality may be automatically suspended, by the transmission of, or interruption of, suitable signals on the control link between proximity units 102 and 112. At that point, mobile cellular telephone 100 would recover full functionality. Alternatively, a user of the system may disable transceiver 111 and re-enable transceiver 101 manually, by using suitable over-ride switches provided on the devices themselves.

It is to be noted here that transceivers 101 and 111 can include conventional components found in (a) a cellular telephone that is in a vehicle or is designed and intended to be transported by an individual, (b) a personal digital assistant, such as Apple Computer Company's "Newton" or (c) a wireless (PCN) terminal such as has been described in many publications, such as Moving Toward a Wireless InfraStructure, Computer World, Oct. 11, 1993, page 51; Why Wait of PCS? Personalized Portable Telephone Services are Here Today, Telecommunications, March 1994, page 41; Wireless Data: Closing the Gap Between Promise and Reality, Telecommunications, March 1994, page 25. The transceiver interacts with the associated proximity unit such that the transceiver can be turned off (made dormant) or turned on (made active) remotely, i.e., on command from the proximity unit. The details of the control provided by proximity units 102 and 112 over respective transceivers 101 and 111 will be apparent to those skilled in the art.

Furthermore, it is to be understood that manual "ON" and "OFF" controls may be provided, as an over-ride of the automatic control provided by the proximity units, or as an alternative thereto.

Referring now to FIG. 2, there is shown a block diagram illustrating the arrangement of base station 110 of FIG. 1. At the heart of base station 110 is microprocessor 115, which operates in accordance with program instructions stored in an associated memory 117. The principal operating process performed in microprocessor 115 is illustrated in FIG. 3, which is discussed below.

Various call distribution functions are performed in base station 110 under the overall control of microprocessor 115. The functions include (a) directing calls received in transceiver 111 to terminal equipment (e.g., terminals 131, 132 of FIG. 1); (b) directing conventional telephone calls to and from wired telephone network 140 to the terminal equipment; (c) and directing certain calls made in the terminal equipment (e.g. terminals 131, 132) to transceiver 111 rather than to wired telephone network 140, so as to achieve an alternative access arrangement. These functions are performed in a switch 200, which receives control inputs from microprocessor 115 on control line 250. Switch 200 can be thought of as a "mini-PBX", since it provides both the switching and call control functionality normally provided by a private branch exchange, but only in the context of several lines, rather than a large number of lines. It may be implemented using one of AT&T's small office key-telephone systems, such as the Merlin® electronic key telephone system, or the AT&T Home Network Controller available from AT&T Paradyne.

Integral to switch 200 are station interface 113 and network interface 114, which respectively interconnect switch 200 to the terminal equipment (such as terminals 131,132) and the wired network 140, respectively. The functions performed by these interfaces are largely conventional, and include assuring that (a) incoming calls delivered via network 140 are connected, through the switching fabric of switch 200, to available terminal equipment, or otherwise to a call and message store 116 that is connected to switch 200, and (b) outgoing calls originated in terminal equipment are connected through the switching fabric to an available circuit connection to network 140. In addition to the foregoing, switch 200 further includes a communication interface 201, that interconnects switch 200 and its switching fabric, via communications line 220, with transceiver 111, so that (a) incoming wireless calls received "over the air" when transceiver 111 is active can be connected, through the switching fabric of switch 200, to available terminal equipment, or otherwise to a call and message store 116 that is connected to switch 200, and (b) outgoing calls originated in terminal equipment can be, if desired, connected through the switching fabric to transceiver 111, so that these calls can be transmitted as wireless calls, rather than wired calls.

It is to be noted here that station interface 113 can implement wired or wireless communication, or a combination thereof, between switch 200 and terminals 131,132, depending upon the capabilities of the terminal equipment itself. For example, station interface 113 can include the capabilities of a conventional cordless base station, and one or more of the terminals 131, 132 can include the capabilities of a conventional cordless handset that can communicate with the base station. Furthermore, other communications devices, such as portable computers, facsimile machines, modems, set top boxes, cordless telephones, etc., may be similarly connected, via appropriate station interfaces, to base station 110, and can be used singly or in combination as terminals 131,132. It is also to be noted that network interface 114 can be arranged to not only connect switch 200 to wired network 140, but also to interconnect switch 200 with (a) a cable communication network, such as a described in U.S. Pat. No. 5,343,240 issued to C. Yu on Aug. 30, 1994, (b) an optical communication network, or (c) any other type of commercially available communication network. These diverse networks can be used singly or in combination with each other.

In addition to providing control signals to switch 200 via control line 250, microprocessor 115 also controls various native functionalities associated with transceiver 111 via a control signal provided on control line 240. These functionalities are typically present in a conventional cellular telephone, and the details of their implementation will be understood by those skilled in the art. The functions are accordingly diagrammatically represented in FIG. 2 as an activate/deactivate function 211, a detect call function 216, an answer call function 212, a make busy function 213, a hang-up function 214, and a dial call function 215, each of which is used in the process illustrated in FIG. 3.

When the activate function 211 is used, transceiver 111 is "turned on", so that incoming calls addressed to a device with an identification number that matches the identification number then being used in the transceiver will be detected and received. The deactivate function is used to turn off transceiver 111, so that it no longer responds to calls, even those normally intended for that device. Typically, the activate function is invoked when signaling between proximity units 102 and 112 indicates that mobile cellular telephone 100 is within a predetermined distance with respect to base station 110, and the deactivate function is invoked when signaling between proximity units 102 and 112 indicates that, after being invoked, mobile cellular telephone 100 is thereafter further than the predetermined distance with respect to base station 110. In base station 110, proximity, or lack thereof, is communicated from proximity unit 112 to microprocessor 115 via a signal on control line 230. Alternatively, as previously explained, a manual override may be provided to invoke the activate and/or deactivate functions in response, for example, to actuation of a control button. Those skilled in the art will appreciate that other criteria and methods may be used for triggering proximity units.

Answer call function 212, when activated, causes transceiver 111, when in the activated state, to answer an incoming wireless call and couple it to communications interface 201 of switch 200, so that the call can be extended to the appropriate terminal equipment, which will then begin to alert or ring. Until an incoming call is answered in transceiver 111 by receipt of a signal invoking the answer call function, the call is held in transceiver 111 such that the caller is aware that the call has not yet been answered. When an ongoing call is completed, and the terminal equipment to which the call was connected hangs up or otherwise terminates the call, this condition is sensed in microprocessor 115, invoking hang-up function 214 in transceiver 111.

Detect call function 216 is performed in transceiver 111 when in the activated state, and allows microprocessor 115 to begin a timing process if unanswered calls are to be routed to call and message store 116. At the appropriate time, after receipt of an incoming call is detected, microprocessor 115 may signal transceiver 111 to invoke answer call function 212, and concurrently signal switch 200 to forward the call to call and message store 116 rather than to the terminal equipment. As previously stated, similar functionality can alternatively be achieved using a conventional answering machine 133.

Make busy function 213 is provided in transceiver 111 in the event that all of the terminal equipment is otherwise in use, as might be the case when outgoing calls have been placed using wired network 140, and it is not desired to offer the caller the opportunity to leave a message. In this event, transceiver 111 will provide a suitable signal to the calling party indicating a busy condition. Note here that in the just described circumstances, the calling party may desirably be unaware that impersonation has occurred, but rather may believe that a call to transceiver 101 could not be completed because that device was already in use. Alternatively, base station 110 may be arranged to provide "call waiting" functionality with respect to both wired and wireless telephone calls, such that, when all terminal equipment is busy, an incoming call is held in switch 200 and the persons currently engaged in communication are advised that another call has arrived and is waiting to be answered.

Dial call function 215 is used with respect to outgoing calls made from terminal equipment connected to base station 110 when such calls are placed through transceiver 111. In this event, the terminal equipment signals microprocessor 115 through a signal communicated via station interface 113 and control line 250, and microprocessor invokes dial call function 215 through a signal communicated via control line 240. Dialed number information is passed to transceiver 111 as needed, and a call is initiated. The communications path for such an outbound call extends from the terminal equipment through station interface 113 and switch 200 to transceiver 111 via communications line 220.

As mentioned previously, memory 117 may be used to store program instructions that control the operation of microprocessor 115. In addition, it may also store one or a plurality of network identification numbers that are used by transceiver 111 when it makes and receives calls. Summarizing what has already been described, in accordance with one aspect of the present invention, impersonation may be achieved by storing the SAME identification number in identification number memories 108 and 118 in both transceiver 101 and in transceiver 111, respectively, and by activating only one transceiver while rendering the other dormant or inactive. This impersonation is particularly well suited in dealing with incoming calls, because the impersonation capability allows calls addressed to a particular physical device (e.g., a portable cellular telephone) to be received and answered in other physical devices (e.g., terminals 131,132). However, several physical devices may be impersonated by a single base station, if desired, and this arrangement is discussed in more detail in connection with FIG. 4.

With respect to outgoing calls, impersonation may also be particularly useful when such calls can be made using any one of several different identification numbers. This is because each of the different numbers can be associated with a different caller profile maintained for example, by the wireless service provider in a database accessed from MTSO 120 of FIG. 1, so that different and customized functions can be offered to callers using the various profiles. For example, each profile may have a different speed dialing list for outgoing calls; each profile may have different billing treatment; and each profile may require inter-exchange calls to be carried by different long distance carriers. If desired, each identification number may correspond to a particular user's own personal telephone number.

To accommodate the multiple impersonation capability just described, stored identification numbers contained in memory 117 may be accessed by microprocessor 115 at appropriate points in the control process. This is discussed more fully in connection with FIGS. 4 and 5.

From the foregoing description, it can be seen that base station 110 of FIG. 2 can be thought of as a hub for a centralized narrow band communication system within the building 130, and a hub for connecting that narrow band system with several different access systems, including copper-based, cable-based, and wireless cellular and/or personal communication networks.

The process performed in microprocessor 115 in base station 110 by which impersonation is accomplished is illustrated in FIG. 3. Once the process is started in step 300, a determination is first made, in step 301, as to whether or not "proximity exists", typically meaning that mobile cellular telephone 100 is within a predetermined distance from base station 110, or that a user of the system has entered an over-ride command causing impersonation to occur. As stated previously, proximity units 102 and 112, by cooperating with each other and exchanging control signals, will normally make the proximity determination. Note here that various other hand-off protocols can be used, depending upon the specific implementation of the present invention. For example, if mobile cellular telephone 100 is a cellular car telephone, proximity may be detected simply by the fact that the car in which mobile cellular telephone 100 is located is turned off; if mobile cellular telephone 100 is a portable unit, proximity may be detected only when mobile cellular telephone 100 is carried into the user's home.

If proximity is found to exist, and a positive result is thus obtained in step 301, a series of steps is next performed to assure that impersonation does not occur if mobile cellular telephone 100 is currently in use on a call. This is advantageous, since when impersonation is invoked, transceiver 101 becomes dormant or inactive, and any ongoing calls may be interrupted. Specifically, in step 305, a status request message is transmitted from base station 110 to mobile cellular telephone 100, requesting a return message, received in step 307, indicating whether or not transceiver 101 is presently in use. If a positive result in detected in step 309, the impersonation is deferred by causing the process to wait for a predetermined time in step 311 before repeating steps 305, 307 and 309. When the status message received in step 307 indicates that transceiver 101 is not in use, a negative result occurs in step 309, and the process advances to step 313. Note here that the exchange of status request and status reply messages can be performed in accordance with numerous specific different implementations which will be apparent to those skilled in the art. For example, signaling such as that found between a cordless telephone base and cordless telephone handset can easily be used to transmit messages between base station 110 and mobile cellular telephone 100.

If a negative result is reached in step 301, this may indicate that impersonation, if previously activated, should be suspended, since transceiver is 101 is no longer near transceiver 111. In this event, a signal is communicated to base station 110 in step 303, to invoke deactivation function 211. Thereafter, the process returns to step 301.

Continuing with the previous explanation, following a negative result in step 309, impersonation of transceiver 101 by transceiver 111 is caused to occur in step 313, by de-activating transceiver 101 and activating transceiver 111, using activate function 211. Transceiver 111 remains thereafter in a ready status in step 315, awaiting the receipt of an incoming call addressed to the identification number contained in memory, which, as stated previously, is the same as the identification number contained in identification number memory 108. Until an incoming call is detected in step 317, a negative result occurs in that step, and therefore step 315 is periodically repeated.

When a call to transceiver 111 is detected in step 317, call detect function 216 is invoked in step 318, so that, as stated previously, a timing process, not shown, can be started. This timing process is useful in determining how to process an incoming call if it is not answered within a predetermined time period. If desired, when the predetermined time period expires without an answer, the call may be routed by 200 to call and message store.

Assuming that the timing process is continuing, a determination is next made, in step 319, as to whether terminal equipment is available to "answer" the incoming call. This is necessary because the terminal equipment may already be busy in connection with calls on other lines. If a negative result occurs in step 319, a determination is next made in step 320 as to whether call storage is desired. A call and message storage option may be selected by a user during the process by which microprocessor 115 is programmed, and requires that call and message store 116 is available. If a positive result occurs in step 320, then the call is connected by switch 200 to call and message store 116 in step 322, and the answer call function 212 is invoked, so that the call received in transceiver 111 is connected through communications interface 201 and switch 200 to call and message store. On the other hand, if a negative result occurs in step 320, then the call cannot be answered, so that make busy function 213 is invoked, alerting the caller that the call should be tried again at a later time.

If the result in step 319 is positive, indicating that the incoming call can be completed to available terminal equipment, answer call function 212 is invoked in step 323, and the call is routed from transceiver 111 through 210 and switch 200 to the available terminal equipment, which rings and is answered normally. Monitoring is then performed, in steps 325 and 327, to determine if the ongoing call is complete. If not, a time delay is introduced in step 327, and the process is repeated. When a positive result occurs in step 325, hang-up function 214 is invoked in step 329.

It is to be noted here that the process of FIG. 3 is illustrative only, and that persons skilled in the art will appreciate that various different functions pertaining to call control can be added and/or enhanced, as desired. These additions and/or enhancements are made depending upon the specific configuration and capabilities of switch 200 and the capabilities of the terminal equipment being used.

Figure 7:
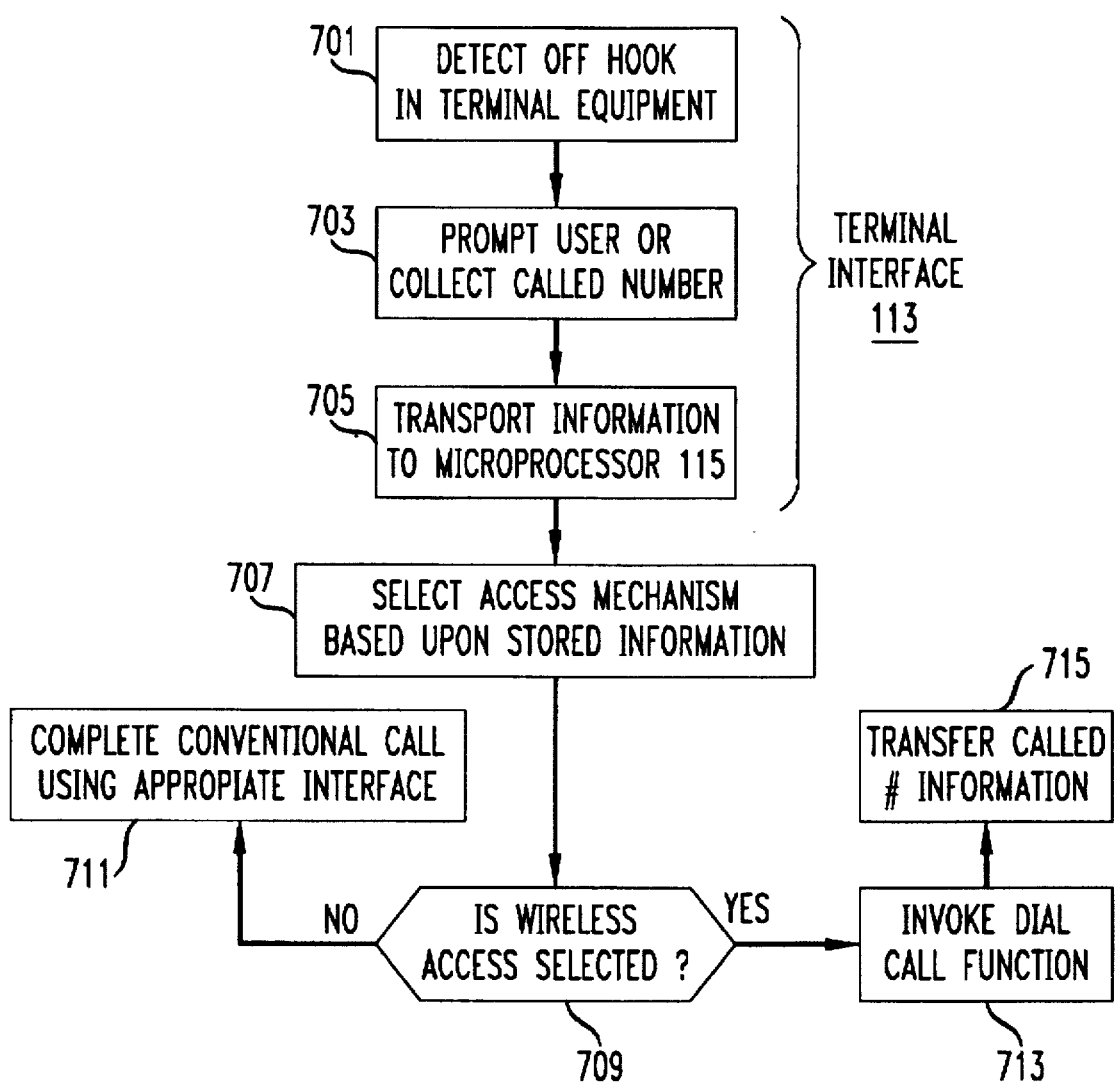
FIG. 7 illustrates one embodiment of a process by which calls can be originated using the system of FIGS. 1 and 2, such that the caller is given a choice with respect to the method of network access that is used, i.e., routing via wired network 140 or via the wireless network.

One embodiment of a process by which calls can be originated using the system of FIGS. 1 and 2, such that the caller is given a choice with respect to the method of network access that is used (i.e., routing via wired network 140 or via the wireless network), is illustrated in FIG. 7. The process begins in step 701, when terminal interface 113 detects an off hook condition in any of the terminal equipment connected thereto. In step 703, the caller is prompted for (or otherwise provides) the called number, and optionally, information indicating the type of access that the caller desires. This information is received by terminal interface 113 and transmitted, in step 705, to microprocessor 115. If the access type was given explicitly, that information is passed to the appropriate interfaces and switch 200 in base station 110, in step 707. Alternatively, the access type can be determined by a database look-up, by consideration, for example, of the called number in conjunction with stored information in memory 117, in order to determine which type of access is preferable at the time that the call is being made, for that particular called number. In yet another alternative, the access decision-making may involve direct signaling that queries database and processing facilities reachable through the wireless access network.

In any event, after the access mechanism is selected in step 707, a determination is made in step 709 as to whether wireless access was selected. If not, the call is completed in the conventional manner in step 711, such that the call is routed over wired network 140 using network interface 114. If wireless access was selected, dial call function 215 is invoked in step 713, and the dialed number, collected in step 703, is forwarded to transceiver 111 in step 715, so that the call may be initiated as a wireless call.

While the present invention has generally heretofore been described in connection with a telephone call, which is one example of a "narrow band" application, it is to be understood that impersonation, as contemplated in accordance with the present invention, can be also applied in the context of a multi-mode and/or a "broad band" application, such as applications involving video and data devices. In a multi-mode embodiment, devices capable of handling several types of calls (i.e., devices that permit both voice and data operation) might switch from one mode to another in step 313, instead of becoming dormant or inactive.

Referring now to FIG. 4, there is illustrated an arrangement that may be used in transceiver 111 when more than one other device is impersonated. In FIG. 4, identification number memory 118 stores the identification numbers of several portable devices (such as cellular telephones). When any call is received in transceiver 111, the identification number of the device being called is captured, in a conventional fashion, in identification number receiver 401 and coupled, on a temporary basis, to buffer 403 until processing is complete. The contents of buffer 403 are applied to a first input of comparator 405 for a predetermined time interval, and then cleared, in anticipation of receipt of the next identification number representing a different call.

The second input to comparator 405 is provided by identification number memory, which is controlled by a sequencer 409 so that the individual identification numbers stored therein are output, one at a time. If any one of the numbers stored in memory 118 matches the number in buffer 403, a positive output from comparator 405 provides a signal to control actuator 407, indicating that the incoming call was directed on one of the portable devices being impersonated. The output of actuator 407, together with information from sequencer 409, can then be used to answer the call and route it to appropriate terminal equipment intended to impersonate the particular portable device to which the call was originally addressed.

Figure 5:
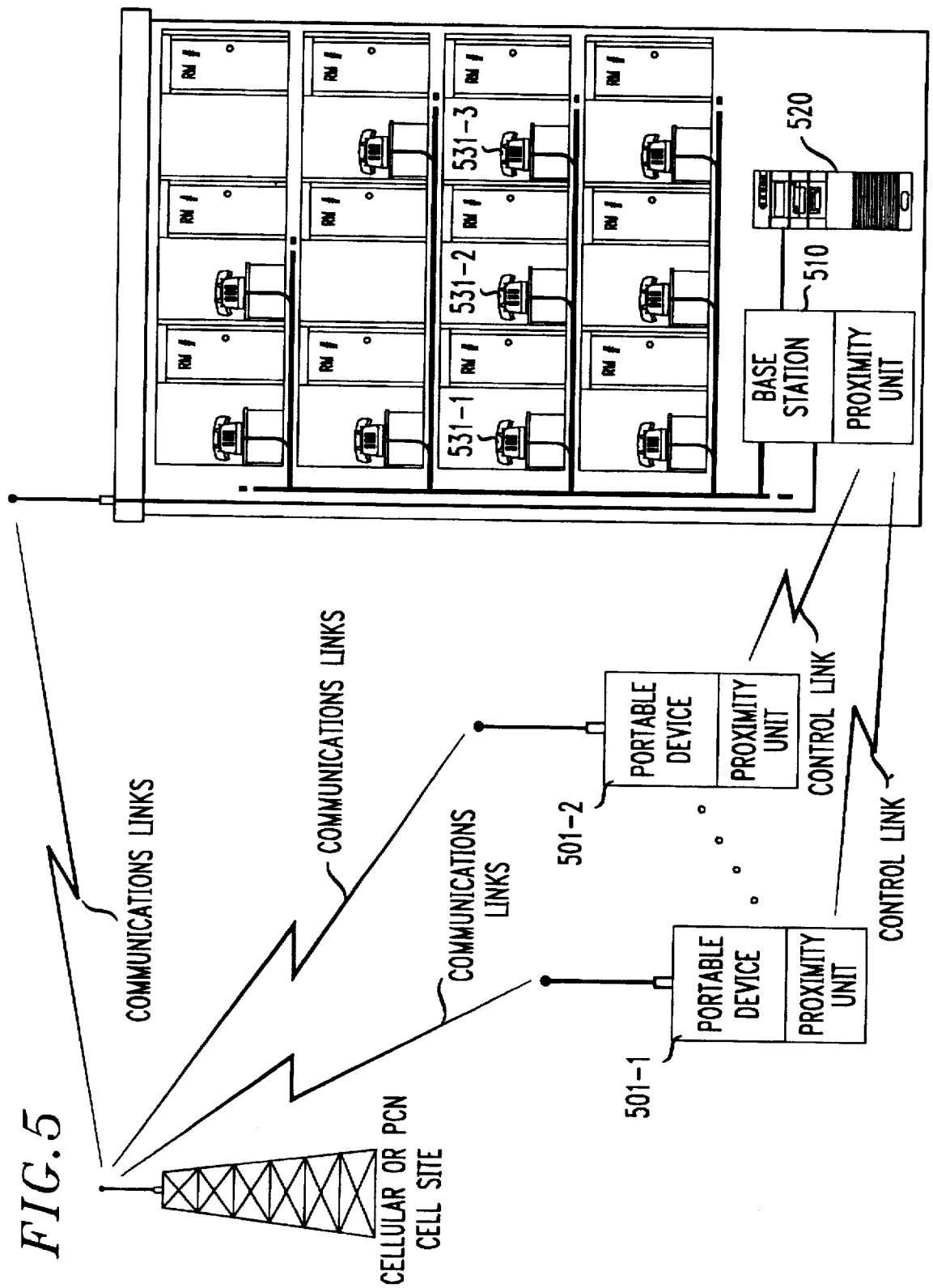
FIG. 5 is a block diagram illustrating an application of the present invention in the context of a hotel or office building in which a plurality of devices are impersonated, and calls are selectively routed to appropriate terminal devices in response to calls placed to the impersonated devices.

The arrangement illustrated in FIG. 4 is particularly useful in the context illustrated in FIG. 5, which is a block diagram of an application of the present invention in multiple unit building, such as a hotel or office building. In this embodiment, a plurality of portable devices 501, such as portable cellular telephones, are impersonated, and calls to any of the impersonated devices are selectively routed to appropriate terminal devices 531, such as telephones in different rooms, in response to calls placed to the impersonated devices 501. In this embodiment, base station 510, which includes the capabilities of a PBX that might normally be found in a hotel or office complex, is interconnected with a conventional computer-based processor 520 that contains information (a) relating to the arrangement of the terminal devices in the hotel or office building, and (b) information that associates particular users and their mobile device identification numbers to particular units (rooms) within the building. The transceiver in base station 510 is provided with a multi-channel capability, and contains an identification number memory into which have been loaded the identification numbers for the plurality of portable devices 501 whose users desire to have calls received through impersonation when the users are in the hotel or office building.

Impersonation, with respect to any particular one of the devices 501 may be triggered by proximity, as previously described, or alternatively by entering information into 520, such as when a guest having a portable phone checks into or returns to a hotel. When impersonation is in effect, and a call is received in base station 510, all of the then active identification numbers in the identification number memory are checked, in sequence, in the manner described in connection with FIG. 4. If an actuation signal is generated by control actuator 407, indicating a positive match, information from 520 may be obtained, in order to determine, for example, in which room a particular guest is registered. This information is passed to 510, allowing the incoming call to be routed to the appropriate terminal equipment.

By virtue of this embodiment of the present invention, a hotel can, for example, offer its guest the ability to continue to receive calls placed to their portable cellular telephones, while the guests are located in their rooms. This avoids the need to use a personal communication device within the hotel, since that device might be unable to function properly because of interference by the building structure. It also makes personal profile information pertaining to each user of mobile devices 501 available with respect to calls originated from their terminal devices 531. In the arrangement of FIG. 5, the hotel needs no special services bought from communication networks, but needs only to install a base station 510 arranged, in accordance with the invention, with multiple channel capability for simultaneously impersonating several mobile communication devices. Because base station 510 handles multiple calls concurrently, it cooperates with processor 520, thereby providing the ability to look up the room number of the called device's owner by means of a table in its data processing system. Note that a similar arrangement to that depicted in FIG. 5 can be used in a hospital, shopping center, theater, office building, etc.

The embodiment illustrated in FIG. 5, as well as other arrangements utilizing the present invention, can raise issues regarding security, since it is contemplated that one transceiver will use the identification number normally associated with another transceiver, and that the impersonating transceiver can abuse or misuse the intended capabilities. This can be prevented in a number of ways. First, in the arrangement of FIG. 5, portable devices 501 may have to be surrendered or plugged into base station 510, in order to render impersonation effective. If a physical connection was required, the identification number residing in a portable device could be automatically transferred to and stored in the identification number memory contained in the base station, and there would be no requirement for a proximity unit. Alternatively, or in addition, a separate authenticator, possibly in the form of a credit card or "smart card" device, would supplement or substitute for the mobile communication device itself.

Second, as with present cellular telephone equipment, the identification numbers could be entered and stored in such a way that they are not accessible by the average user, and require special equipment that can be accessed and programmed only by professionals (e.g., dealers) having the appropriate security clearance as well as the appropriate programming system.

Finally, it is to be noted that the unauthorized proliferation of identification numbers must be prevented by users themselves, in the same manner as credit card numbers and other valuable information is guarded today.

Figure 6:
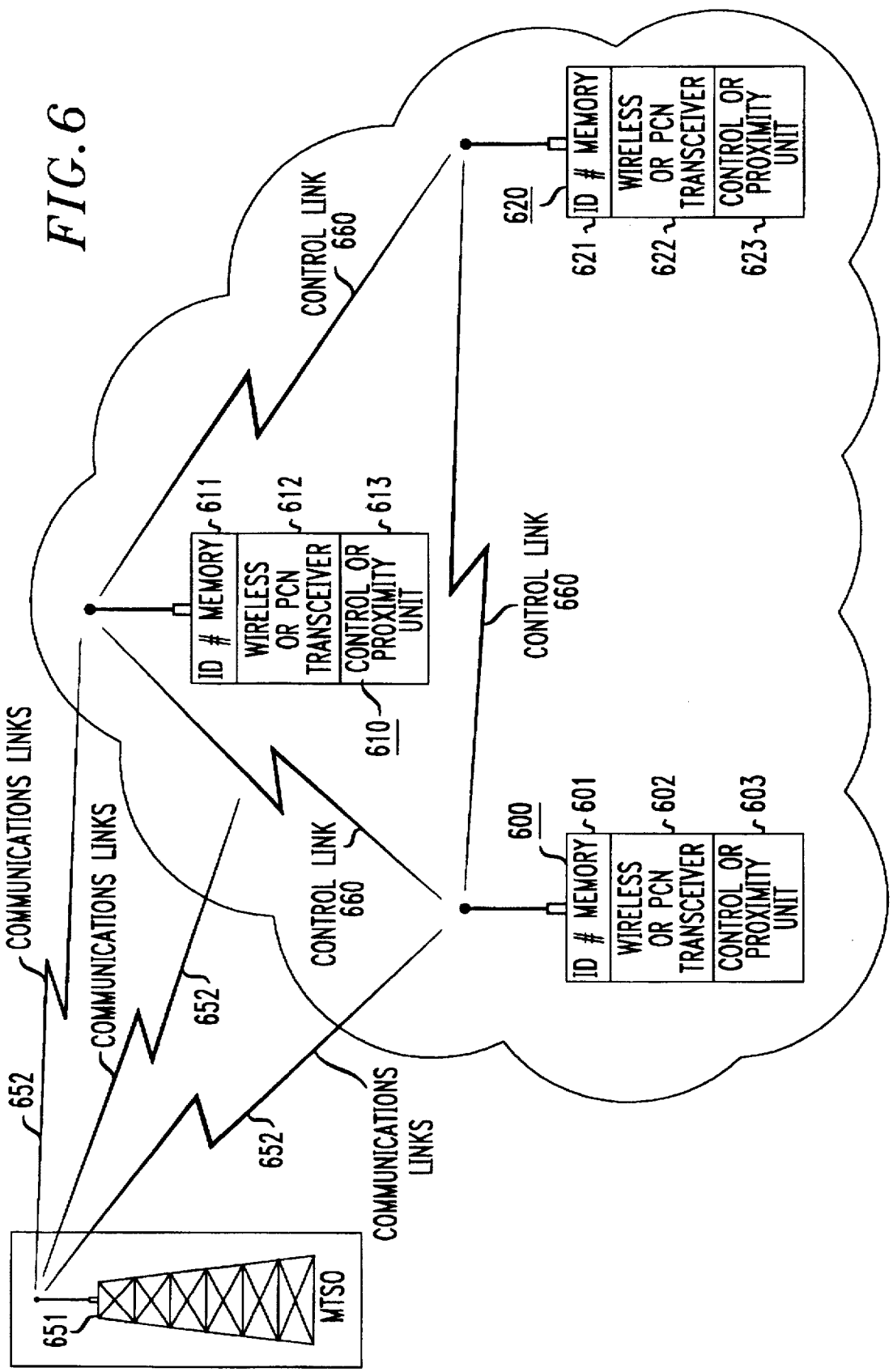
FIG. 6 is a diagram illustrating an arrangement in which multiple communications devices can selectively impersonate one another.

Referring now to FIG. 6, there is shown an arrangement in which multiple communications devices 600, 610 and 620, which can all be portable, can selectively impersonate one another. Each of the devices 600, 610, 620 is located in an area 640 in which wireless communications is provided by an MTSO 650 that, for example, broadcasts via an over-the-air link 652 using antenna 651. Each of the devices 600, 610, 620 includes a respective wireless transceiver portion, 602, 612 and 622, which enables two-way communication between the device and remote parties via communications routed to and from the device using MTSO 650. Each of the devices 600, 610, 620 includes a respective identification number memory 601, 611, 621 in which can be stored either (a) a different identification number, uniquely identifying each particular device, or (b) selectively, the same identification number as that ordinary used by another device, so that, in the latter event, one device can impersonate another. Control of the identification number contained in identification number memory 601, 611, 621 is maintained by respective control/proximity units 603, 613 and 623 in each device, which may be arranged to perform functions similar to those described above in connection with proximity units 102 and 112. Additional control functionality is described below.

Using the arrangement of FIG. 6, one of the communications devices 600, 610 and 620 can be "paired" with another one of the devices, so that either one of the devices can impersonate the other. Impersonation can be triggered by physical proximity of the devices, when they are within a predetermined distance from each other, as heretofore explained. Additionally, control functionality incorporated into control/proximity units 603, 613 and 623 can provide for signaling between devices, via control links, to enable entry of selected pre-stored identification numbers into the appropriate identification number memory 601, 611, 621. This will, for example, allow a user of one device to relinquish call receiving ability to another device. Alternatively, one device may relinquish control to the "next" device in a pre-fixed sequence. This functionality would be useful when, for example, the leader of a group of field repair personnel is incapacitated or busy. The leader might then effectively transfer incoming communications on her or his device to another person's device, if it is nearby. If no other devices are located in area 640 to accept the transfer, an incoming call is simply not answered.

Persons skilled in the art will appreciate that various modification and adaptations may be made of the present invention. Accordingly, the invention should be limited only by the appended claims.

What is claimed is:

1. A system for completing wireless telephone calls, comprising:

first and second transceivers arranged to originate and receive wireless telephone calls using a first communications channel;

means for determining that said first transceiver is in close proximity to said second transceiver using a second communications channel different from the first communications channel; and means responsive to said determining means for altering the operation of each of said first and second transceivers so that calls directed to and normally answered by said first transceiver are completed to said second transceiver and for deactivating said first transceiver.

2. A system for originating wireless telephone calls, comprising:

first and second transceivers arranged to originate and receive wireless telephone calls using a first communications channel;

means for determining that said first transceiver is in close proximity to said second transceiver using a second communications channel different from the first communications channel; and means responsive to said determining means for altering the operation of each of said first and second transceivers so that calls normally originated by said first transceiver are originated by said second transceiver as though they were made by said first transceiver and for deactivating said first transceiver.

3. The system defined in claim 1 or claim 2, wherein each of said transceivers has an active state and a dormant state; and said altering means is arranged to switch said first transceiver from said active state to said dormant state and to switch said second transceiver from said dormant state to said active state.

4. The system defined in claim 1 or claim 2, wherein each of said transceivers includes an identification number memory for processing calls originated or received by said transceivers when in said active state in accordance with a stored identification number; and wherein an identification number stored in said identification number memory in each of said transceivers is the same.

5. The system defined in claims 1 or 2 wherein each of said transceivers includes means for storing a plurality of network identification numbers and control means for selectively using particular ones of said identification numbers in said identification number memory.

6. The system defined in claim 5 wherein said control means is arranged so that only one of said transceivers is allowed to use any of said identification numbers at any time.

7. The system defined in claims 1 or 2, wherein said first transceiver is portable and said second transceiver is stationary.

8. The system defined in claim 7, wherein said second transceiver is connected to terminal equipment arranged to receive calls placed over a wired telephone network.

9. The system defined in claim 1 or claim 2, wherein said first and second transceivers are cellular telephones;

each of said cellular telephones include a memory for storing an identification number to which said cellular telephone responds, and the identification numbers in each of said memories is the same.

10. The system defined in claim 1 or claim 2, wherein said system further includes means for coupling the output of said second transceiver to at least one stationary terminal device.

11. The invention defined in claim 10 wherein said coupling means is arranged to provide private branch exchange (PBX) functionality.

12. A system for originating wireless telephone calls, comprising:

a telecommunications network;

first and second transceivers arranged to originate and receive wireless telephone calls using a first communications channel;

means for determining that said first transceiver is in close proximity to said second transceiver using a second communications channel different from the first communications channel;

means for controlling said first transceiver to hand over its functionality to said second transceiver and to become dormant when said transceivers are in close proximity to each other; and means responsive to said controlling means for altering the operation of each of said first and second transceivers, so that calls originated in said second transceiver are processed in said communications network in a manner that is identical to the manner in which calls originating in said first transceiver are processed and for deactivating said first transceiver.

13. A system for selectively originating telephone calls from a second transceiver using outgoing call characteristics of a first transceiver, comprising:

means associated with respective first and second identification number memories in each of said first and second transceivers for controlling the origination of outgoing calls using a first communications channel and for selecting network-resident profiles with which said outgoing calls are associated;

means for determining that said first transceiver is in close proximity to said second transceiver using a second communications channel different from the first communications channel;

means for causing said second transceiver to impersonate said first transceiver by storing the same identification numbers in said first and second identification number memories; and means for rendering said first transceiver dormant and said second transceiver active when it is determined that said first transceiver is within a predetermined distance from said second transceiver.

14. A system for completing wireless telephone calls using a first communications channel, comprising:

first and second wireless communication devices, said first and second devices adapted, when activated within the operating region of a cell site, to receive selected calls based upon an identification number associated with each call;

means for selecting calls received in said first and second devices each in response to the same identification number;

means for determining that said first wireless communication device is in a particular portion of a particular cell site using a second communications channel different from the first communications channel that is in a predetermined location with respect to said second wireless communication device; and means responsive to said determining means for causing said first device to become deactivated and said second device to become activated, so that telephone calls made using said identification number are selected and directed to said second device for a limited period of time.

15. A system for originating wireless telephone calls using a first communications channel, comprising:

first and second wireless communication devices, said first and second devices adapted, when activated within the operating region of a cell site, to originate outgoing calls based upon an identification number associated with each device;

means for determining that said first wireless communication device is in a predetermined location with respect to said second wireless communication device using a second communications channel different from the first communications channel; and means responsive to said determining means for causing said first device to become deactivated and said second device to become activated, so that telephone calls are originated for a limited period of time in said second wireless device, using said identification number normally used to originate calls in said first wireless device.

16. A system for allowing one wireless communication device to impersonate another wireless communication device using a first communications channel, comprising:

means in each communication device for storing an identification number used to identify incoming communications messages to which said device responds;

means for determining if said communication devices are in proximity to each other using a second communications channel different from the first communications channel; and means responsive to said determining means for causing said one device to assume the identification number of said another communication device so that the one wireless communication device can impersonate the another wireless communication device and the another wireless communication device becomes dormant.

17. The invention defined in claim 16, wherein said one communication device is portable and said another communication device is stationary.

18. The invention defined in claim 16, wherein said system further includes a switch, a plurality of terminals connected to said switch, and means for routing calls from said one device through said switch to one of said terminals.

19. The invention defined in claim 18, wherein said switch is connected to the wired telecommunication network.

20. The invention defined in claim 19, wherein said wireless communication devices are arranged to originate and receive calls using a wireless communication network, and said system further includes means for routing calls made from said terminals either through said wired telecommunications network or through said wireless communication network.

21. A system for completing calls using a first communications channel, comprising:

a first mobile cellular telephone and a second stationary cellular telephone, each having the same cellular telephone number and using a first communications channel, means for controlling said cellular telephones so that only one of said cellular telephones is active at any one time, a proximity unit in each of said first mobile cellular telephone and second stationary cellular telephone, said proximity units arranged to generate a control signal using a second communications channel different from the first communications channel when one of said proximity units is within a predetermined distance from the other, and means responsive to said control signal for activating said mobile cellular telephone and deactivating said stationary cellular telephone.

22. A communications system wherein one communications device selectively impersonates another communications device using a first communications channel, comprising:
- means in each device for storing a network identification number that controls selection of incoming calls to which the device responds;
- means for controlling one device to use the same network identification number normally associated with the other device;
- means for determining that the one communications device and the other communications device are in close proximity to each other using a second communications channel different from the first communications channel;
- means responsive to the determining means for activating said controlling means; and
- means for automatically deactivating the another communications device when the one communications device impersonates the another communications device.

23. A method of completing wireless telephone calls using a first communications channel, comprising the steps of:
- determining by using a second communications channel different from the first communications channel that a first transceiver arranged to originate and receive wireless telephone calls is in close proximity to said second transceiver arranged to originate and receive wireless telephone calls;
- responsive to said determining step, altering the operation of each of said first and second transceivers so that calls directed to and normally answered by said first transceiver are completed to said second transceiver; and
- deactivating said first transceiver when said first transceiver and said second transceiver are in close proximity to each other.

24. A method of originating wireless telephone calls using a first communications channel, comprising the steps of:
- determining by using a second communications channel different from the first communications channel that a first transceiver arranged to originate and receive wireless telephone calls is in close proximity to said second transceiver arranged to originate and receive wireless telephone calls;
- responsive to said determining step, altering the operation of each of said first and second transceivers so that calls normally originated by said first transceiver are originated by said second transceiver as though they were made by said first transceiver; and
- deactivating said first transceiver when said first transceiver and said second transceiver are in close proximity to each other.

25. The method defined in claim 23 or claim 24 wherein each of said transceivers has an active state and a dormant state; and
said altering step includes switching said first transceiver from said active state to said dormant state and switching said second transceiver from said dormant state to said active state.

26. The method defined in claim 23 or claim 24 wherein each of said transceivers includes an identification number memory for processing calls originated or received by said transceivers when in said active state in accordance with a stored identification number; and
wherein said method further includes the steps of
storing a plurality of network identification numbers in each of said transceivers, and;
selectively using particular ones of said identification numbers in said identification number memory.

27. The method defined in claim 23 or claim 24 wherein said method further includes the step of coupling the output of said second transceiver to at least one stationary terminal device.

28. A method for originating wireless telephone calls using a first communications channel, comprising the steps of:
- arranging first and second transceivers to originate and receive wireless telephone calls using a telecommunications network;
- controlling said first transceiver to hand over its functionality to said second transceiver when said transceivers are in close proximity to each other;
- determining by using a second communications channel different from the first communications channel that said first and second transceivers are in close proximity to each other;
- altering the operation of each of said first and second transceivers when it is determined that said first transceiver and said second transceiver are in close proximity to each other, so that calls originated in said second transceiver are processed in said communications network in a manner that is identical to the manner in which calls originating in said first transceiver are processed; and
- deactivating said first transceiver when it is determined that said first transceiver and said second transceiver are in close proximity to each other.

29. A method of completing wireless telephone calls using a first communications channel, comprising the steps of:
- arranging first and second wireless communication devices, when activated within an operating region of a cell site, to receive selected calls based upon an identification number associated with each call;
- selecting calls received in said first and said second devices each in response to the same identification number;
- determining by using a second communications channel different from the first communications channel that said first wireless communication device is in a particular portion of a particular cell site that is in a predetermined location with respect to said second wireless communication device; and
- responsive to said determining step, causing said first device to become deactivated and said second device to become activated, so that telephone calls made using said identification number are selected and directed to said second device for a limited period of time.

30. A method of originating wireless telephone calls using a first communications channel, comprising the steps of:
- arranging first and second wireless communication devices, when activated within an operating region of a cell site, to originate outgoing calls based upon an identification number associated with each device;
- determining by using a second communications channel different from the first communications channel that said first wireless communication device is in a predetermined location with respect to said second wireless communication device; and
- responsive to said determining step, causing said first device to become deactivated and said second device to become activated, so that telephone calls are originated for a limited period of time in said second wireless device, using said identification number normally used to originate calls in said first wireless device.

31. A method for allowing one wireless communication device to impersonate another wireless communication device using a first communications channel, comprising the steps of:

storing in each communication device an identification number used to identify incoming communications messages to which said device responds;

determining by using a second communications channel different from the first communications channel if said communication devices are in close proximity to each other; and responsive to said determining step, causing said one communication device to assume the identification number of said other communication device and causing said other communication device to become dormant upon determining that said communication devices are in proximity to each other thereby allowing said one wireless communication device to impersonate said other wireless communication device.

32. The method defined in claim 31, wherein said one communication device is portable and said other communication device is stationary.

33. The method defined in claim 31, wherein said method further includes the step of routing calls from said one device through a switch to one of a plurality of terminals connected to said switch.

34. The method defined in claim 31, wherein said wireless communication devices are arranged to originate and receive calls using a wireless communication network, and said method further includes the step of routing calls made from said terminals either through said wired telecommunications network or through said wireless communication network.

35. A method of competing calls using a first communications channel, comprising the steps of arranging a first mobile cellular telephone and a second stationary cellular telephone so that each has the same cellular telephone number, controlling said cellular telephones so that only one of said cellular telephones is active at any one time, arranging a proximity unit in each of said first and second transceivers, said proximity units to generate a control signal using a second communications channel different from the first communications channel when one of said proximity units is within a predetermined distance from the other, and responsive to said control signal, activating said mobile cellular telephone and deactivating said stationary cellular telephone.

36. A communications method wherein one communications device selectively impersonates another communications device using a first communications channel, comprising the steps of:

storing in each device a network identification number that controls selection of incoming calls to which the device responds;

controlling one device to use the same network identification number normally associated with the other device; and activating said controlling step as a function of the proximity of one device to the other using a second communications channel different from the first communications channel to cause the another communications device to deactivate and cause the one communications device to impersonate the deactivated communications device.

* * * * *